UNITED STATES PATENT OFFICE.

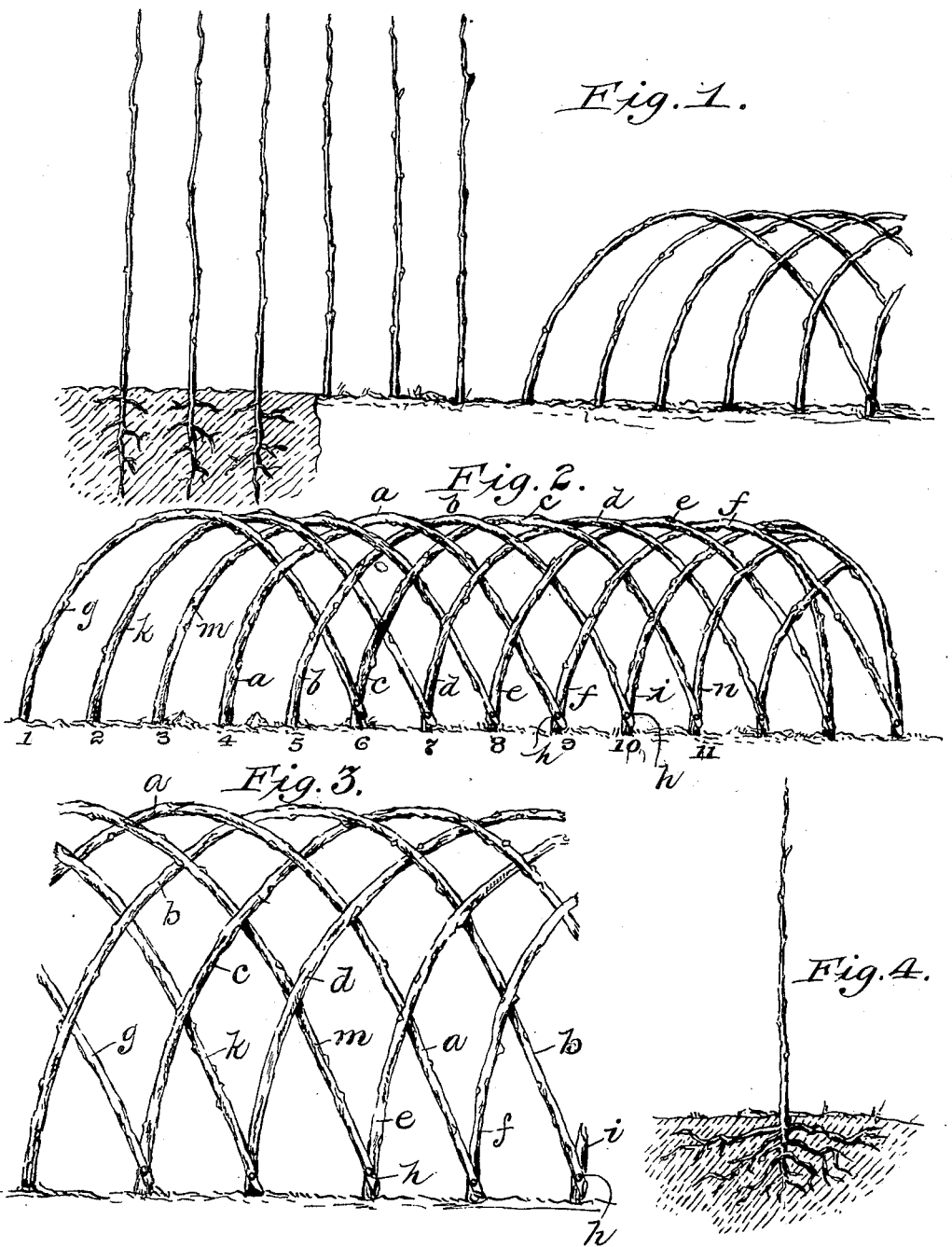

ERASTUS P. KEPNER, OF NORA, ILLINOIS.

HEDGE FENCE.

SPECIFICATION forming part of Letters Patent No. 657,876, dated September 11, 1900.

Application filed February 2, 1899. Serial No. 704,252. (No model.)

*To all whom it may concern:*

Be it known that I, ERASTUS P. KEPNER, a citizen of the United States, residing at Nora, in the county of Jo Daviess and State of Illinois, have invented certain new and useful Improvements in Hedge Fences; and I do hereby declare the following to be a full, clear, and exact description of the invention, such as will enable others skilled in the art to which it appertains to make and use the same.

My invention relates to a system of constructing live or hedge fences which are constructed, preferably, of Osage-orange plants and to a fence constructed in accordance with said system; and it consists in a hedge fence of suitable plants arranged in a single straight row at suitable distances apart, each plant being bent over in the form of an arch lying substantially in the vertical plane of the row and having its bent-over upper end secured near the earth, the plants being interwoven in the manner fully described hereinafter and afterward specifically pointed out in the claims.

In the accompanying drawings, Figure 1 is a front elevation of a single row of Osage-orange plants, the plants having attained a proper growth and arranged at suitable distances apart and stripped of all leaves and branches, some of them ready to be bent over, interwoven, and secured in the manner shown in Fig. 2 and others bent over and interwoven. Fig. 2 is a front elevation of a completed hedge fence constructed in accordance with my invention, but before the branches and leaves have again grown out after being removed and before the temporary fastening means have decomposed. Fig. 3 is an enlarged detailed view of a section of a hedge, showing more clearly the manner of interweaving; and Fig. 4 represents a transplanted plant, showing its spreading roots.

In carrying out my invention and constructing a fence in accordance with the same I have found from practical experience that when hedge fences are made from transplanted plants a large number of branch surface roots grow out from the plant, as shown in Fig. 4, which absorb a good deal of moisture from the soil on both sides of the fence and prevent successful cultivation close to the fence and also render such ground very uneven and inconvenient for bringing a hedge-trimmer close up to the fence. It is obvious that in transplanting where the roots are cut innumerable roots grow out, and to avoid this growth of branch roots and the evils attendant thereon I prefer to sow the seed and grow the plants in the hedge-line rather than to transplant slips grown for such purposes, although such transplanted plants may be used in the construction of my fence. I have found that by growing the hedge from seed there will be one large tap-root and a comparatively few branch roots. The roots after the plants are set never being disturbed or cut, there is no opportunity for a great number of branch surface roots to grow. By proper cultivation and care the growth of these plants can be considerably hastened. After the plants have grown for a proper length of time, which would vary in different climates, they are stripped of all leaves and branches, as shown in Fig. 1, and are then bent over and interwoven, as clearly shown in Figs. 2 and 3. It is important in interweaving the plants that the plants be not bent over too sharply, for if this is done the plants will either be killed or their growth greatly retarded, and yet at the same time it is important that the hedge should be as close and as strong as possible at the bottom. It is also important that the fastening means employed should not be so large or have to be so tightly secured to the plants as to stop the free flow of the sap or injure the plants in any manner. To overcome these objections, I have constructed a hedge in which the plants are given as long a sweep or curve as possible and at the same time have so interwoven the plants that a very tight close fence is secured at the bottom and one in which the openings will be uniform practically the entire length of the fence. The uniform size of openings due to this system of interweaving is very important. The fasteners which are employed are not intended to hold the plants for all time, but only temporarily, and are of such a size and character as not to in any way injure the plants. With the first two or three plants the interweaving cannot be fully carried out, but beginning with the fourth plant, and so on to near the extreme other end of the fence, the interweaving is perfectly carried out. The manner of interweaving is as follows: Taking the fifth plant, in Fig. 2, which is lettered *b*, it is bent over and extends in front of and across the first and second plants, which are lettered *g k*, respectively, and then back of and across the two succeeding plants—that is, the third and fourth plants—which are lettered *m* and *a*, respectively, then over plants *c* and *d*—that is, the sixth and seventh plants—and then beneath the eighth and ninth plants, which are lettered *e* and *f*, respectively, said plant *b* having its lower end extended in front of the tenth plant (lettered *i*) and attached thereto near the bottom of the hedge by means of small brads *h*, as clearly shown in Fig. 3. The plants may be temporarily secured in any other manner by means which will temporarily hold them in place until a sufficient growth has been attained. The other plants are interwoven similar to the plant lettered *b*. For instance, the plant lettered *c* extends across and in front of the plants lettered *k* and *m* and back of and across the plants lettered *a* and *b* and in front of the plants lettered *d* and *e* and back of the plants lettered *f* and *i* and is secured to the plant lettered *n* very near the ground, as clearly shown. This plant *c* is also secured near the point from which it started to the plant *g*, close to the ground. The same style of interweaving is carried on throughout the entire length of the hedge. It will be seen from this construction and arrangement that a very long curve or bend is given to each plant and that the interweaving is uniform, the openings being the same throughout near the ground, which construction and arrangement does not break or injure the plants, but admits of their free growth and at the same time secures a very close and tight fence.

In some sections of the country, particularly in the West, where severe electrical storms occur, it is impracticable to employ a hedge fence the securing means for which is composed of strands of wire arranged in various ways and extending the entire length of the hedge. My construction of a hedge is particularly designed to overcome this objection.

By arranging the plants in a single straight line instead of a double straight line or a double zigzag line I am enabled to produce a much narrower and closer fence and one which can be trimmed more closely, for the reason that the machine can be brought up closer to all the plants.

Having now described my invention, what I claim, and desire to secure by Letters Patent, is—

1. A hedge fence comprising a single straight row of plants bent over in the same direction, each plant having the form of an arch and all being substantially in the vertical plane of the row, all the plants being interwoven in the same vertical plane, passing across each other in the process of interweaving, by twos, and each plant having its bent-over upper end secured to another plant in the row, near the earth, substantially as described.

2. A hedge fence comprising a single straight row of plants, as 1, 2, 3, 4, 5, 6, 7, 8, 9, 10 and 11, bent over or arched in the same direction and in substantially the vertical plane of the row, each plant, as plant 5, being passed in front of plants 1 and 2, behind plants 3 and 4, in front of plants 6 and 7, and behind plants 8 and 9, and secured to plant 10, near the earth, substantially as and for the purpose set forth.

In testimony whereof I hereunto affix my signature in presence of two witnesses.

ERASTUS P. KEPNER.

Witnesses:
JOHN GESNER,
H. H. DIGGS.